US008352270B2

(12) United States Patent

Wang et al.

(10) Patent No.: US 8,352,270 B2

(45) Date of Patent: Jan. 8, 2013

(54) INTERACTIVE TTS OPTIMIZATION TOOL

(75) Inventors: Jian-Chao Wang, Beijing (CN); Lu-Jun Yuan, Beijing (CN); Sheng Zhao, Beijing (CN); Fileno A. Alleva, Redmond, WA (US); Jingyang Xu, Beijing (CN); Chiwei Che, Beijing (CN)

(73) Assignee: Microsoft Corporation, Redmond, WA (US)

( * ) Notice: Subject to any disclaimer, the term of this patent is extended or adjusted under 35 U.S.C. 154(b) by 775 days.

(21) Appl. No.: 12/481,510

(22) Filed: Jun. 9, 2009

(65) Prior Publication Data

US 2010/0312565 A1 Dec. 9, 2010

(51) Int. Cl.
*G10L 15/00* (2006.01)

(52) U.S. Cl. ...................... 704/260; 704/275; 369/30.02

(58) Field of Classification Search .................. 704/260, 704/275; 369/30.02
See application file for complete search history.

(56) References Cited

U.S. PATENT DOCUMENTS

| | | | | |
|---|---|---|---|---|
| 7,881,934 | B2 * | 2/2011 | Endo et al. | 704/251 |
| 2005/0060158 | A1 * | 3/2005 | Endo et al. | 704/275 |
| 2008/0167875 | A1 * | 7/2008 | Bakis et al. | 704/258 |
| 2009/0228271 | A1 * | 9/2009 | Desimone | 704/231 |

OTHER PUBLICATIONS

Braga, et al." HMM-Based Brazilian Portuguese TTS", Retrieved at<<http://download.microsoft.com/download/A/0/B/A0B1A66A-5EBF-4CF3-9453-4B13BB027F1F/Braga_Propor08.pdf>>, Propor 2008 Special Session: Applications of Portugese Speech and Languages Technologies, Sep. 10, 2008, Curia , Portugal, pp. 48-51.

Braga, et al."Automatic Word Stress Marker for Portuguese TTS", Retrieved at<<http://jth2008.ehu.es/cd/pdfs/articulo/art_44.pdf>>, V Jornadas en Tecnología del Habla, pp. 179-182.

Kaur, et al."Smoothening Amplitude in Speech Synthesis", Retrieved at<<http://www.rimtengg.com/coit2007/proceedings/pdfs/55.pdf>>, Proceedings of National Conference on Challenges & Opportunities in Information Technology (COIT-2007), RIMT-IET, Mandi Gobindgarh. Mar. 23, 2007, pp. 273-276.

"Speech Control Editor", Retrieved at<<http://msdn.microsoft.com/en-us/library/bb857375.aspx>>, 2005, p. 1.

Eisenberg Anne, "What's Next; Text-to-Speech Programs with Touchy-Feely Voices", Retrieved at<<http://www.nytimes.com/1999/03/25/technology/what-s-next-text-to-speech-programs-with-touchy-feely-voices.html?sec=&spon=&pagewanted=all>>, Published: Thursday, Mar. 25, 1999, pp. 3.

Schroder, et al."The Mary TTS Entry in the Blizzard Challenge 2008", Retrieved at<<http://festvox.org/blizzard/bc2008/dfki_Blizzard2008.pdf>>, pp. 6.

(Continued)

*Primary Examiner* — Daniel D Abebe

(74) *Attorney, Agent, or Firm* — Turk IP Law, LLC

(57) ABSTRACT

An interactive prompt generation and TTS optimization tool with a user-friendly graphical user interface is provided. The tool accepts HTS abstraction or speech recognition processed input from a user to generate an enhanced initial waveform for synthesis. Acoustic features of the waveform are presented to the user with graphical visualizations enabling the user to modify various parameters of the speech synthesis process and listen to modified versions until an acceptable end product is reached.

20 Claims, 12 Drawing Sheets

OTHER PUBLICATIONS

Rustellet, et al."Automatic Word Stress Marking and Syllabification for Catalan TTS", Retrieved at<<http://download.microsoft.com/download/A/0/B/A0B1A66A-5EBF-4CF3-9453-4B13BB027F1F/Interspeech_08_313.pdf>>, Sep. 22-26, Brisbane Australia, 2008 ISCA, pp. 1889-1892.

* cited by examiner

FIG. 9
900
MANAGE SESSIONS
WORKING FOLDER
D:\\SESSIONS
Browse...
SESSIONS:
990
SESSION0
TEXT
SESSION1
HELLO WORLD!
SESSION2
HELLO WORLD, WELCOME TO USE...
992
994
996
PLAYBACK
OPEN SESSION
CANCEL

INTERACTIVE TTS OPTIMIZATION TOOL

BACKGROUND

A text-to-speech system (TTS) is one of the human-machine interfaces using speech. TTSs, which can be implemented in software or hardware, convert normal language text into speech. TTSs are implemented in many applications such as car navigation systems, information retrieval over the telephone, voice mail, speech-to-speech translation systems, and comparable ones with a goal of synthesizing speech with natural human voice characteristics. Modem text to speech systems provide users access to multitude of services integrated in interactive voice response systems. Telephone customer service is one of the examples of rapidly proliferating text to speech functionality in interactive voice response systems.

Many systems employing a TTS engine require human-like voice output to speak static content (prompts). When the recording person is not available, a prompt generation tool is usually used to help generate such prompts. A prompt generation tool helps people to manipulate text-to-speech output to achieve better prosody, naturalness, etc. A common deficiency of these tools is the lack of ease of use and efficiency to get a satisfying result, because the representation of waveforms is hard to be understood by people with little or no speech synthesis background.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to an interactive prompt generation and TTS optimization tool with an easy-to-understand graphical user interface representation of the TTS process that can be employed to guide user through different speech recognition and synthesis technologies for the generation of initial text-to-speech output.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
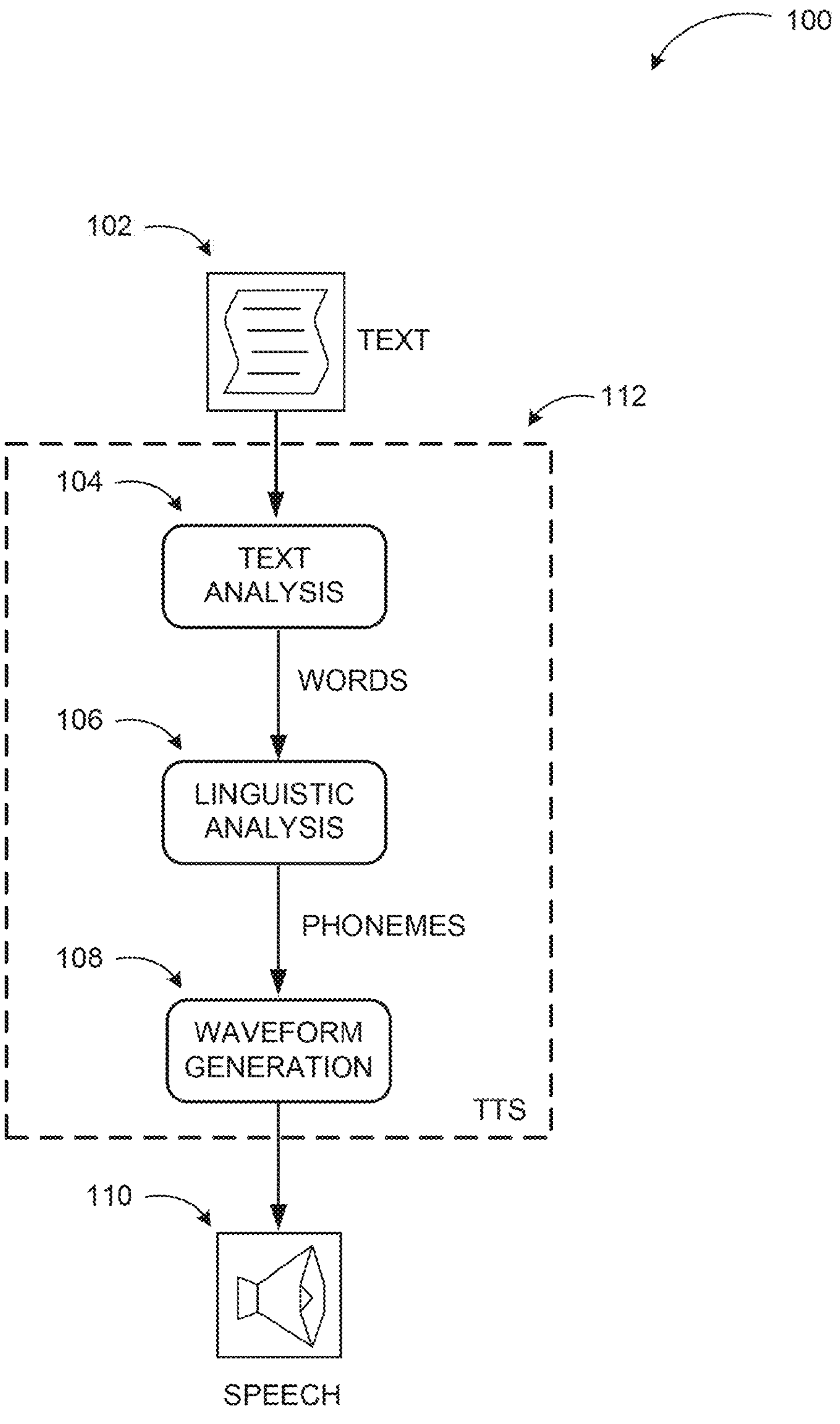
FIG. 1 is a conceptual diagram of a speech synthesis system.

As briefly described above, an interactive prompt generation and TTS optimization tool with an easy-to-understand graphical user interface representation of the TTS process may be employed to guide users through different speech recognition and synthesis technologies for the generation of initial text-to-speech output. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "TTS" is a Text To Speech system. TTS system refers to a combination of software and hardware components for converting text to speech. Examples of platforms include, but are not limited to, an Interactive Voice Response (IVR) system such as those used in telephone, vehicle applications, and similar implementations. The term "server" generally refers to a computing device executing one or more software programs typically in a networked environment. However, a server may also be implemented as a virtual server (software programs) executed on one or more computing devices viewed as a server on the network. More detail on these technologies and example operations is provided below. Also, the term "engine" is used to refer to a self contained software application that has input(s) and an output(s).

FIG. 1 is a block diagram illustrating top level components in a text to speech system. Synthesized speech can be created by concatenating pieces of recorded speech from a data store or generated by a synthesizer that incorporates a model of the vocal tract and other human voice characteristics to create a completely synthetic voice output.

Text to speech system (TTS) 112 converts text 102 to speech 110 by performing an analysis on the text to be converted, an optional linguistic analysis, and a synthesis putting together the elements of the final product speech. The text to be converted may be analyzed by text analysis component 104 resulting in individual words, which are analyzed by the linguistic analysis component 106 resulting in phonemes. Waveform generation component 108 synthesizes output speech 110 based on the phonemes.

Depending on a type of TTS, the system may include additional components. The components may perform additional or fewer tasks and some of the tasks may be distributed among the components differently. For example, text normalization, pre-processing, or tokenization may be performed on the text as part of the analysis. Phonetic transcriptions are then assigned to each word, and the text divided and marked into prosodic units, like phrases, clauses, and sentences. This text-to-phoneme or grapheme-to-phoneme conversion is performed by the linguistic analysis component 106.

Two major types of generating synthetic speech waveforms are concatenative synthesis and formant synthesis. Concatenative synthesis is based on the concatenation (or stringing together) of segments of recorded speech. While producing close to natural-sounding synthesized speech, in this form of speech generation differences between natural variations in speech and the nature of the automated techniques for segmenting the waveforms may sometimes result in audible glitches in the output. Sub-types of concatenative synthesis include unit selection synthesis, which uses large databases of recorded speech. During database creation, each recorded utterance is segmented into some or all of individual phones, diphones, half-phones, syllables, morphemes, words, phrases, and sentences. An index of the units in the speech database is then created based on the segmentation and acoustic parameters like the fundamental frequency (pitch), duration, position in the syllable, and neighboring phones. At runtime, the desired target utterance is created by determining the best chain of candidate units from the database (unit selection).

Another sub-type of concatenative synthesis is diphone synthesis, which uses a minimal speech database containing all the diphones (sound-to-sound transitions) occurring in a language. A number of diphones depends on the phonotactics of the language. At runtime, the target prosody of a sentence is superimposed on these minimal units by means of digital signal processing techniques such as linear predictive coding. Yet another sub-type of concatenative synthesis is domain-specific synthesis, which concatenates prerecorded words and phrases to create complete utterances. This type is more compatible for applications where the variety of texts to be outputted by the system is limited to a particular domain.

In contrast to concatenative synthesis, formant synthesis does not use human speech samples at runtime. Instead, the synthesized speech output is created using an acoustic model. Parameters such as fundamental frequency, voicing, and noise levels are varied over time to create a waveform of artificial speech. While the speech generated by formant synthesis may not be as natural as one created by concatenative synthesis, formant-synthesized speech can be reliably intelligible, even at very high speeds, avoiding the acoustic glitches that are commonly found in concatenative systems. High-speed synthesized speech is, for example, used by the visually impaired to quickly navigate computers using a screen reader. Formant synthesizers can be implemented as smaller software programs and can, therefore, be used in embedded systems, where memory and microprocessor power are especially limited.

HMM-based speech synthesis is also an acoustic model based synthesis method employing Hidden Markov Models. Frequency spectrum (vocal tract), fundamental frequency (vocal source), and duration (prosody) of speech are commonly modeled simultaneously by HMMs. Speech waveforms are then generated from HMMs themselves based on a maximum likelihood criterion.

HMM based text to speech systems (HTSs), which can be automatically trained, can generate natural and high quality synthetic speech and reproduce voice characteristics of the original speaker. HTSs utilize the flexibility of HMMs such as context-dependent modeling, dynamic feature parameters, mixture of Gaussian densities, tying mechanism, speaker and environment adaptation techniques.

There are many parameters in speech synthesis, variation of which may result in different perception by different users. For example, pitch, dialect, gender of speaker, and so on may influence how synthesized speech is perceived by users. In conventional prompt generation tools, an initial wave is first generated by the core text-to-speech engine. Then, the user needs to adjust acoustic features like duration, prosody, energy, etc. on top of this wave. Due to the limitation of current concatenation text-to-speech technology, the voice quality gap between the initial synthesized voice and the expected result is usually significant because of poor prosody prediction algorithms and similar challenges.

Figure 2:
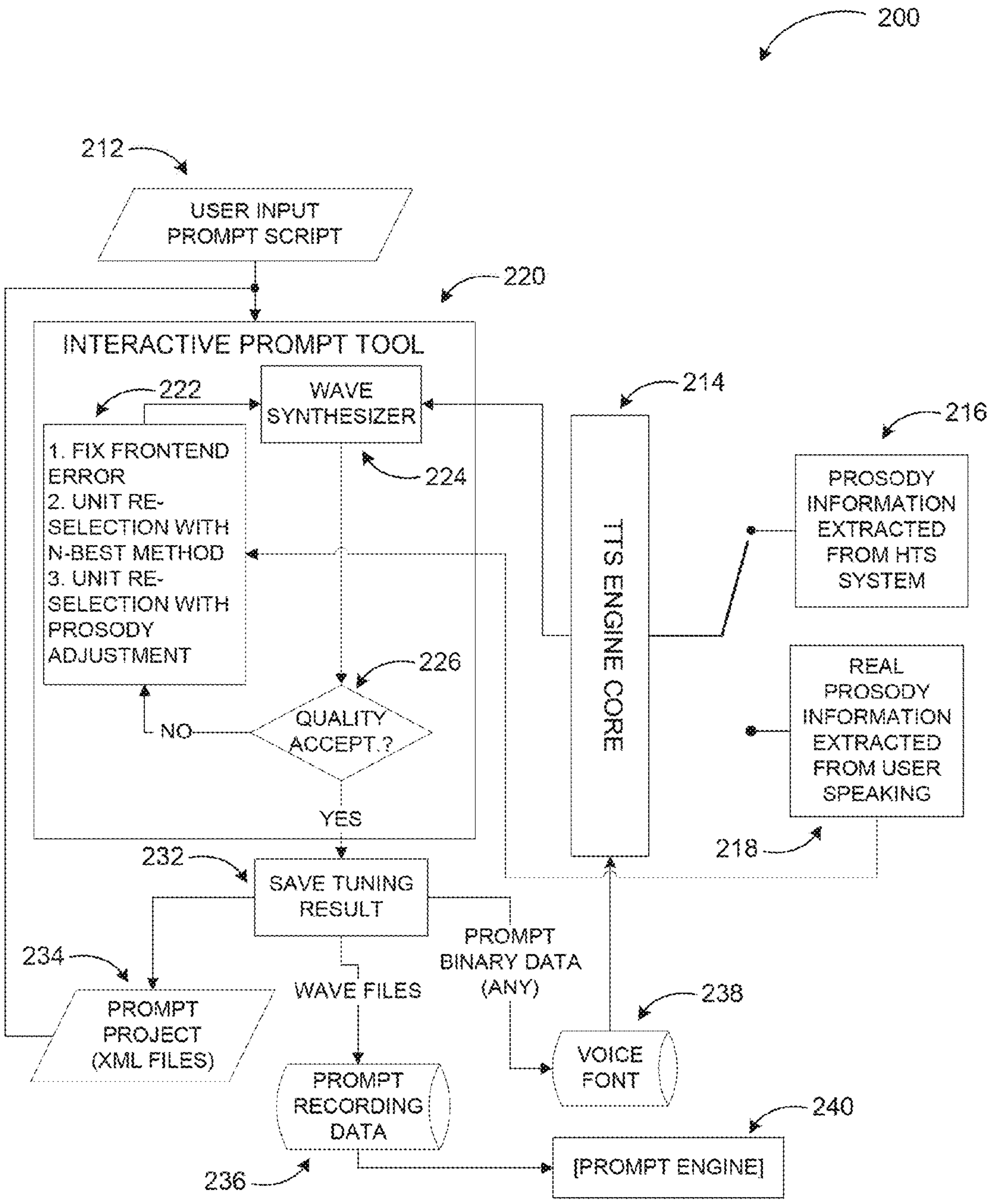
FIG. 2 is a block diagram illustrating major components and their interactions in an example text to speech (TTS) system employing an interactive TTS optimization tool according to embodiments.

FIG. 2 is a block diagram illustrating major components and their interactions in an example text to speech (TTS) system employing an interactive prompt generation and TTS optimization tool according to embodiments. A system according to embodiments provide for a user-friendly graphical user interface (GUI) presenting key acoustic information to a user and render the tuning of the speech synthesis more efficient. Furthermore, Hidden Markov Text to Speech (HTS) technology may be used to provide better prosody information in guiding the prompt generation tool to generate higher quality synthesized voice. Moreover, speech recognition technology may be employed to extract real prosody information for guiding the prompt generation tool to synthesize voices with similar prosody.

The system illustrated in diagram 200 includes a TTS engine core 214 and the interactive prompt generation/TTS optimization tool 220. As discussed above, the TTS engine core 214 may receive prosody information extracted from an HTS system 216 or real prosody information extracted from the user's own voice 218. TTS engine core 214 provides information for generating the initial waveform to wave synthesizer 224 of the interactive tool 220. Wave synthesizer 224 may also receive text input from the user in form of prompt script (212).

Interactive tool 220 enables an iterative process of checking the quality (226) of the synthesized wave with feedback (222) provided to wave synthesizer 224. Feedback process (222) may include correction of frontend errors, acoustic unit reselection, unit reselection with prosody adjustment, and similar modifications. Once the quality is deemed acceptable, the end product may be saved (232) in a structured project file (e.g. an xml file) 234, as a recording (236), and as binary data (voice font 238) for use by the TTS engine core. The recordings may also be provided to a prompt engine 240 for further processing depending on the application type.

The prosody information (pitch/duration/energy) may be abstracted to simple visual presentation in an interactive tool according to embodiments. For example, the pitch curve may be displayed in a simple format and duration/energy represented through width and/or color of GUI elements. These representations may reduce a user's learning curve and operation complexity without losing tuning ability.

Since HTS technology can generate better prosody information, prosody information is extracted from an HTS system and used to guide the concatenative TTS system in a system according to one embodiment. This helps the system to generate better initial waveforms. When the initial synthesized voice is closer to an expected result, the users' tuning effort is simplified increasing an efficiency of the TTS system.

Furthermore, the user is also enabled to speak the desired output for recording by the tool. The interactive tool extracts key acoustic information including pitch variation, duration, and energy of each phoneme to guide the text-to-speech engine in generating the initial synthesized voice. With such guidance, the users' tuning effort is again significantly simplified. Users with little or no speech prosody knowledge may be enabled to utilize the interactive tool to adjust prosody information.

Figure 3:
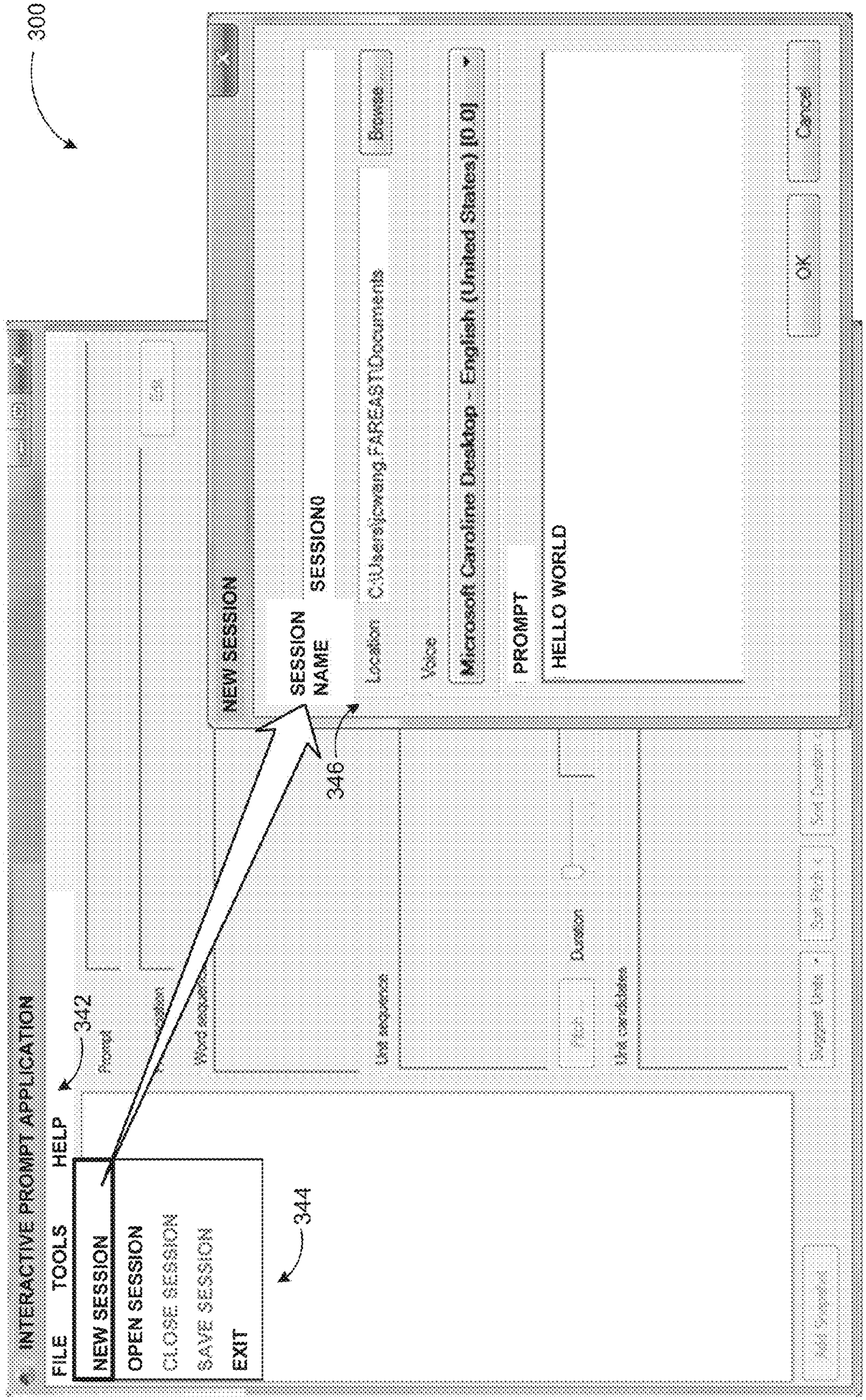
FIG. 3 illustrates screenshots of example user interfaces for opening a session to generate a prompt in an interactive TTS optimization tool according to embodiments.

FIG. 3 illustrates screenshots of example user interfaces for opening a session to generate a prompt in an interactive TTS optimization tool according to embodiments. Prompts may be processed as "Sessions" by the interactive tool shown 342 in diagram 300. A user may be enabled to open an existing session, open a new session (for generating a new prompt), close an existing session, or save an existing session through a dropdown menu 344.

When a new session is selected a new window 346 may be opened enabling the user to specify a name for the session, a location for saving the session, and a prompt type. Moreover, the user may be enabled to input the text to be converted to speech for the new prompt.

Figure 4:
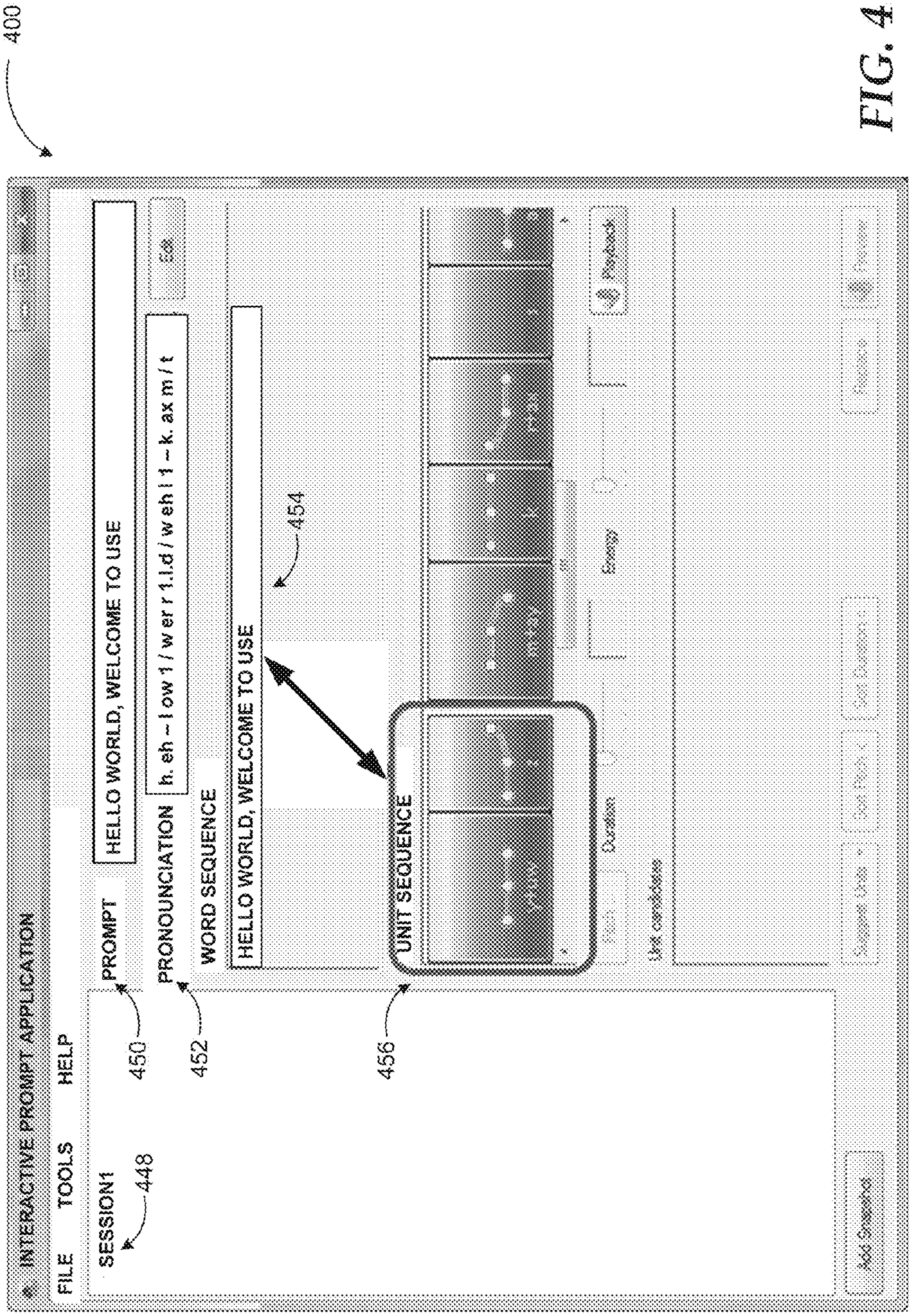
FIG. 4 illustrates a screenshot of an example user interface for editing pronunciation of synthesized speech in an interactive TTS optimization tool according to embodiments.

FIG. 4 illustrates a screenshot of an example user interface for editing pronunciation of synthesized speech in an interactive TTS optimization tool according to embodiments. As shown in diagram 300, the currently active session 448 may be listed in the user interface along with the original text prompt 450 provided by the user and a pronunciation 452 of the text prompt. The pronunciation may be provided in a standardized format such as International Phonetic Alphabet (IPA) or other standard forms. Word sequence 454 provides the text prompt in actionable format, where the user may select words in the sequence and see text analysis results.

Unit sequence 456 displays acoustic units comprising the prompt presented in graphical format such that the user can visually determine a pitch and length for each unit. For example, an incline in the graphical representation may indicate higher pitch, while the opposite indicates a lower pitch. Upon receiving a selection of a word in the word sequence from the user, the user interface may also display a link between the selected word and corresponding acoustic units.

Figure 5:
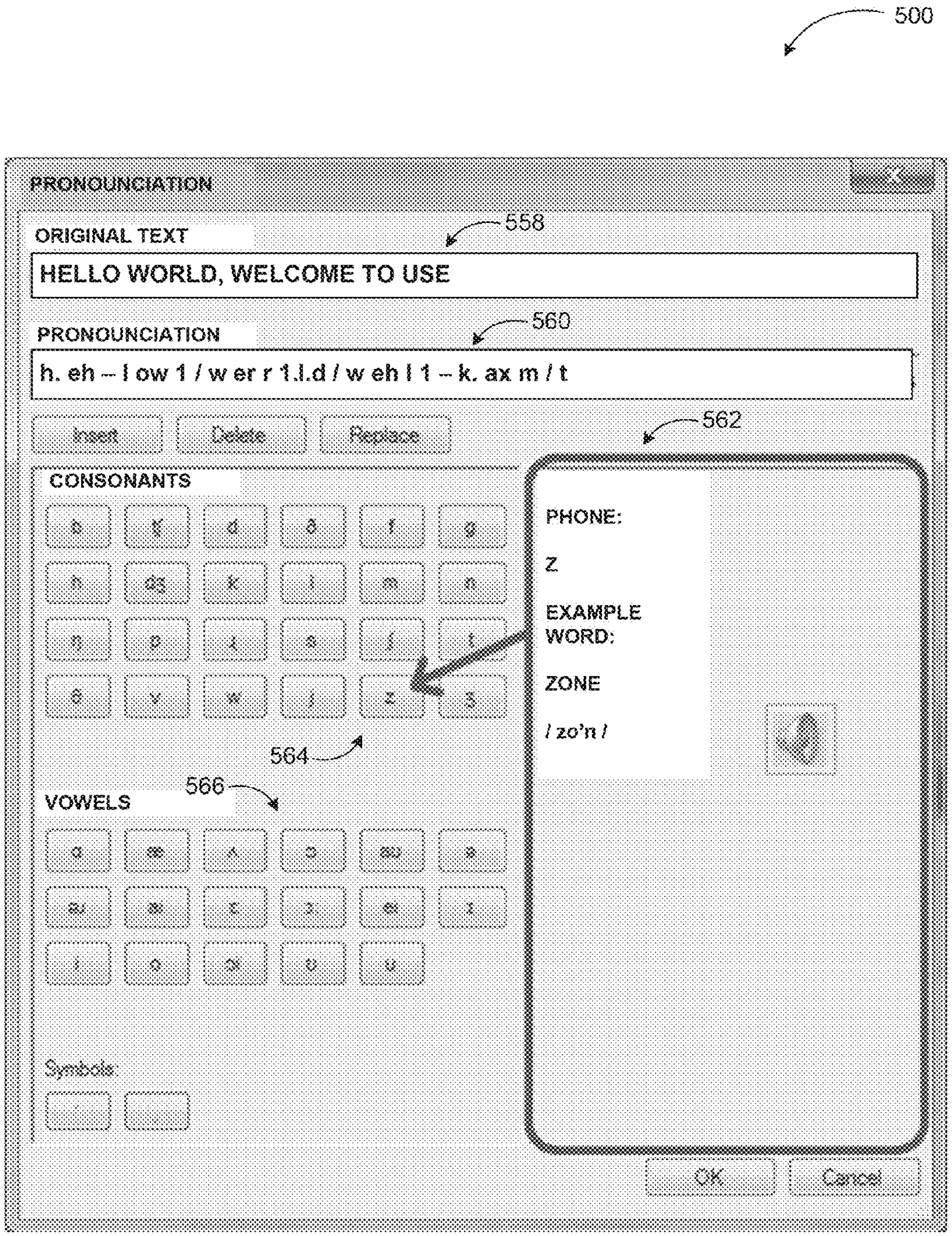
FIG. 5 illustrates a screenshot of an example user interface for detailed level editing of pronunciation of synthesized speech in an interactive TTS optimization tool according to embodiments.

FIG. 5 illustrates a screenshot of an example user interface for detailed level editing of pronunciation of synthesized speech in an interactive TTS optimization tool according to embodiments. The user interface shown in diagram 500 includes the original text prompt 558 and the pronunciation 560, where each character in the pronunciation is selectable. Thus, a user can select individual phonetic characters, replace, delete, or insert new ones. Available phonetic characters are presented in two groups: consonants 564 and vowels 566.

As individual phonetic characters are selected information associated with them (562) such as usage of the character in an example word and an audio playback of the same may be provided to the user. The phonetic character list may be modified depending on which phonetic alphabet is used.

Figure 6:
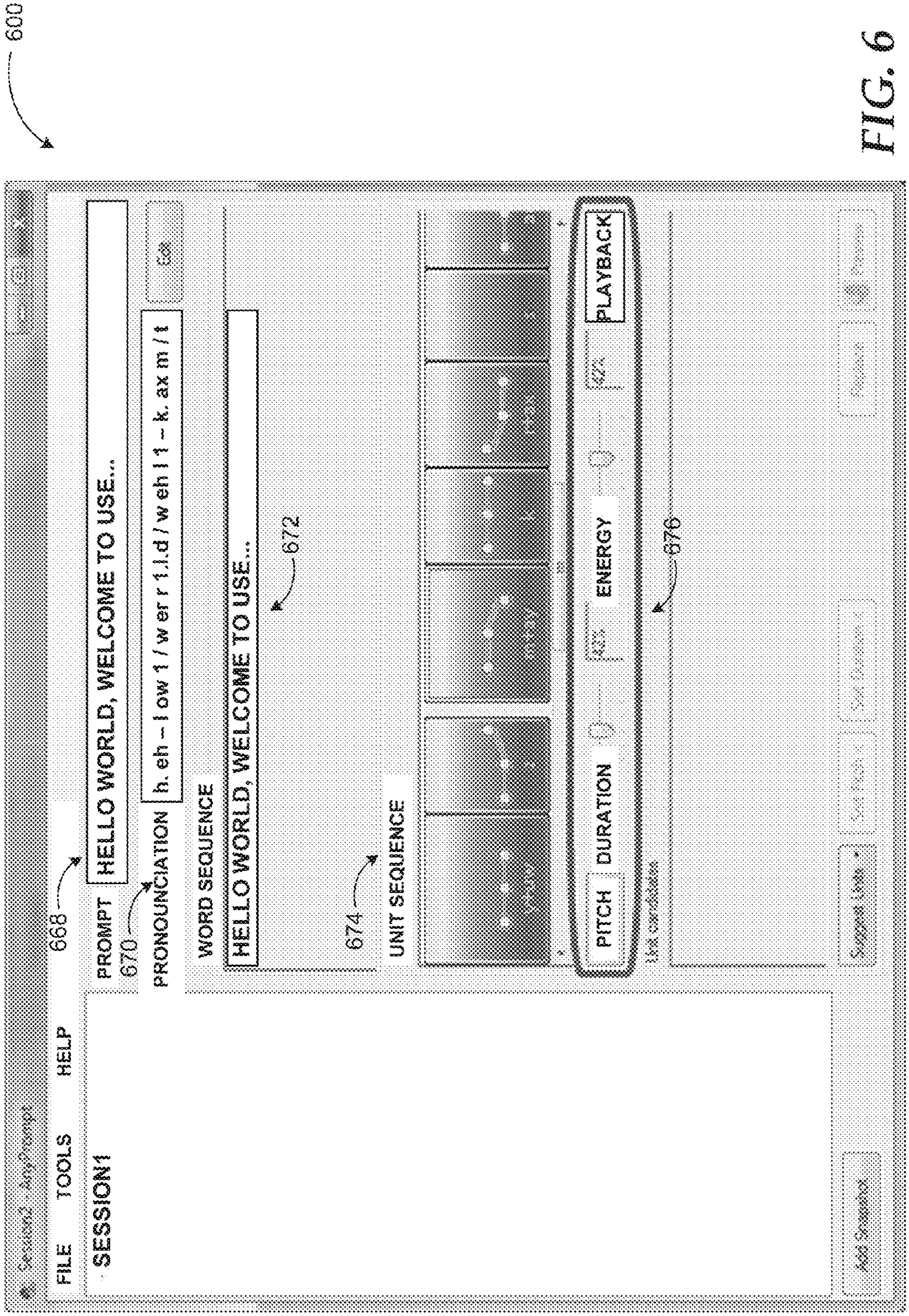
FIG. 6 illustrates a screenshot of an example user interface for editing various parameters of pronunciation of synthesized speech in an interactive TTS optimization tool according to embodiments.

FIG. 6 illustrates a screenshot of an example user interface for editing various parameters of pronunciation of synthesized speech in an interactive TTS optimization tool according to embodiments. The user interface shown in diagram 600 is similar to the user interface of FIG. 4 with the text prompt 668, corresponding pronunciation 670, word sequence 672, and acoustic unit sequence 674.

Additional elements 676 of the user interface shown in diagram 600 include a click-on button for modifying a pitch of a currently selected acoustic unit, a slide scale for adjusting the duration of the currently selected acoustic unit, and a second slide scale for adjusting an energy of the currently selected acoustic unit. A click-on button for playing back the current selection is also provided as part of the user interface.

Figure 7:
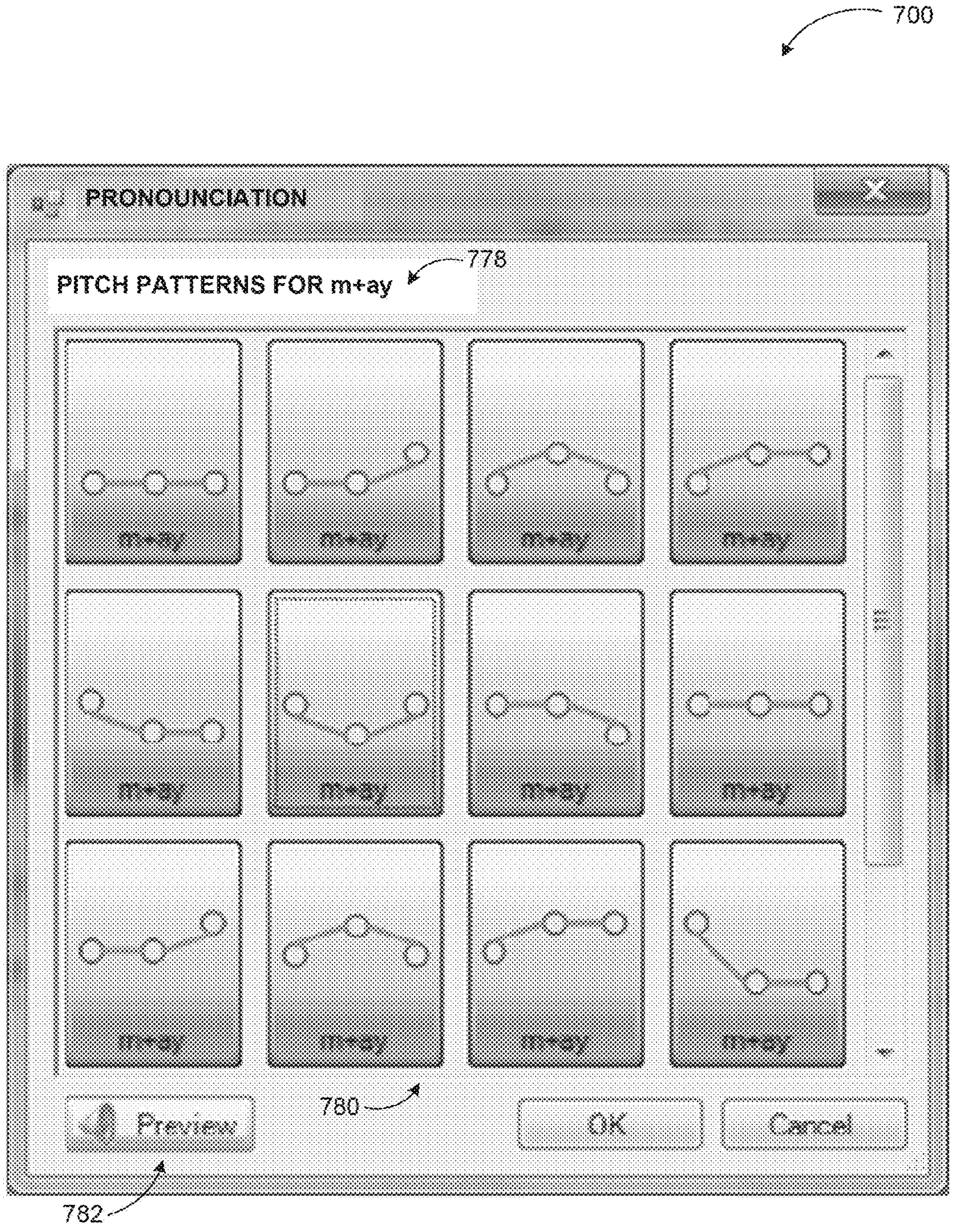
FIG. 7 illustrates a screenshot of an example user interface for selecting among available pitch options for pronunciation of synthesized speech in an interactive TTS optimization tool according to embodiments.

FIG. 7 illustrates a screenshot of an example user interface for selecting among available pitch options for pronunciation of synthesized speech in an interactive TTS optimization tool according to embodiments. The user interface in diagram 700 illustrates options provided to the user if the "pitch" click-on button in the user interface of FIG. 6 is selected by the user.

The user interface, which may be a activated as a new window is identified as "Pitch Patterns for m+ay" (778), where m+ay is the currently selected acoustic unit. Various pitch patterns 780 are provided in a visual form for the user to select. The visual format is a user-friendly way of enabling the user to modify the pitch of the prompt on a unit by unit basis without having to guess how each alternative sounds. A preview button 782 enables the user to listen to alternative pitch patterns.

Figure 8:
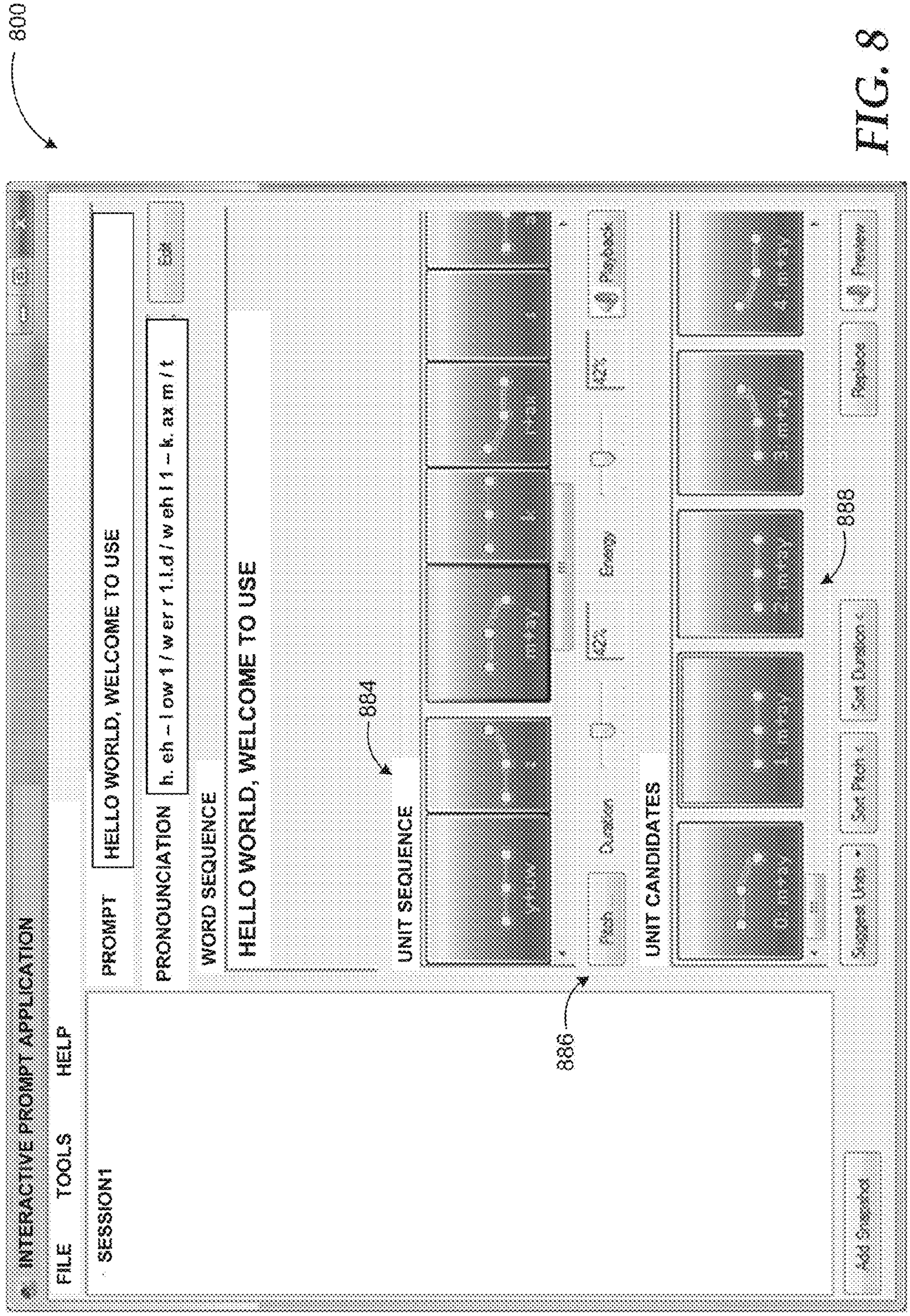
FIG. 8 illustrates a screenshot of an example user interface for selecting among available pronunciation units of synthesized speech in an interactive TTS optimization tool according to embodiments.

FIG. 8 illustrates a screenshot of an example user interface for selecting among available pronunciation units of synthesized speech in an interactive TTS optimization tool according to embodiments. The user interface shown in diagram 800 is similar to the user interface of FIG. 4 with the text prompt, corresponding pronunciation, word sequence, acoustic unit sequence 884, and prosody parameter controls 886.

Differently from the user interface of FIG. 4, a number of acoustic unit candidates 888 are displayed underneath the acoustic unit sequence 884. The acoustic unit candidates may be selected and/or prioritized based on input from an HTS abstraction or extraction and analysis of user's own voice by the TTS engine. Other helpful tools for the user may include a button for suggesting acoustic units, a button for sorting pitch alternatives, and a button for sorting duration alternatives. As with other user interfaces discussed above, a playback button may also be provided to enable the user to listen to a current selection.

Figure 9:
FIG. 9 illustrates a screenshot of an example user interface for managing sessions associated with distinct prompts of synthesized speech in an interactive TTS optimization tool according to embodiments.

FIG. 9 illustrates a screenshot of an example user interface for managing sessions associated with distinct prompts of synthesized speech in an interactive TTS optimization tool according to embodiments.

The "Manage Sessions" user interface shown in diagram 900 is for enabling the user to efficiently find, open, save, and close sessions for various prompts. A storage location 990 may be provided, where the user can type in the location or browse through a different method. Found sessions may be listed (992) with their assigned names and the corresponding text or each session.

A playback button enables the user to listen to selected prompts without activating an edit user interface. An open session button enables the user to activate the edit user interface where he/she can edit various aspects the synthesized prompt as discussed previously.

The TTS based systems, components, configurations, user interface elements, and mechanisms illustrated above are for example purposes and do not constitute a limitation on embodiments. An interactive TTS optimization tool according to embodiments may be implemented with other components and configurations using the principles described herein.

Figure 10:
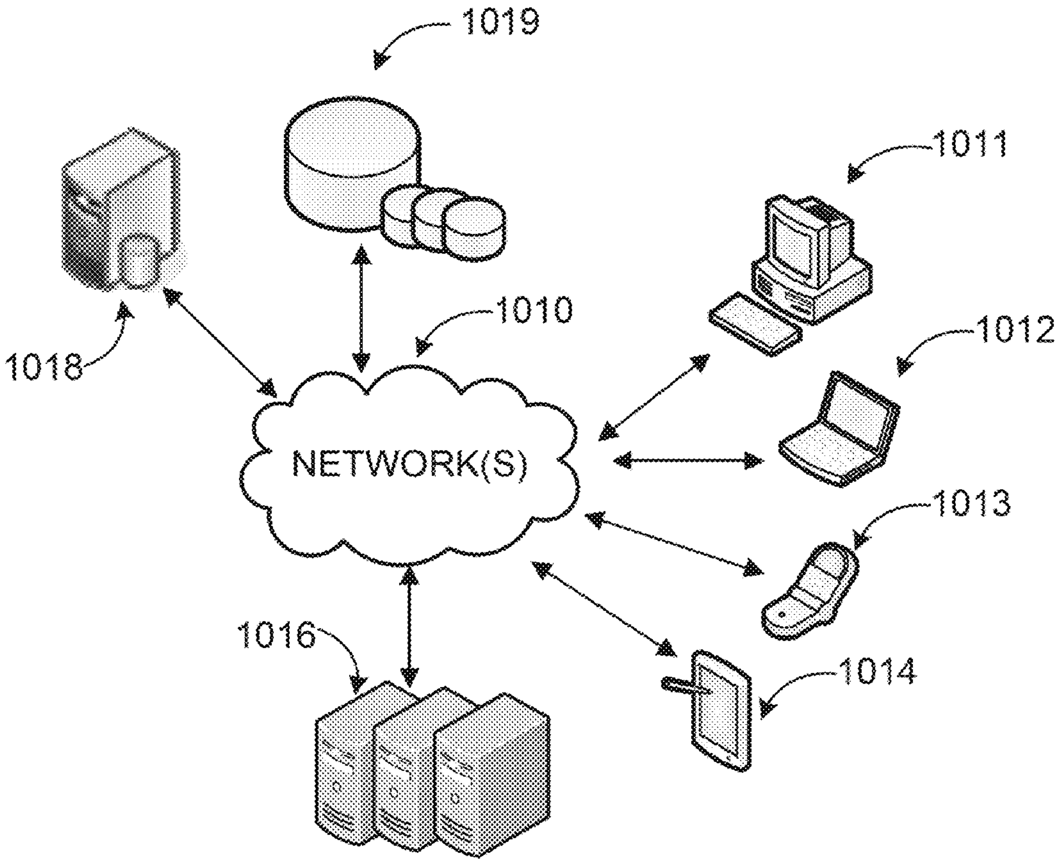
FIG. 10 is a networked environment, where a system according to embodiments may be implemented.

FIG. 10 is an example environment, where embodiments may be implemented. An interactive TTS optimization and prompt generation tool may be implemented via software executed over one or more servers 1016 such as a hosted service. The platform may communicate with client applications on individual computing devices such as a cellular phone 1013, a laptop computer 1012, desktop computer 1011, handheld computer 1014 ('client devices') through network(s) 1010.

As discussed previously, client devices 1011-1014 are used to facilitate communications employing a variety of modes between users of the TTS system. TTS related information such as pronunciation elements, training data, and the like may be stored in one or more data stores (e.g. data store 1019), which may be managed by any one of the servers 1016 or by database server 1018.

Network(s) 1010 may comprise any topology of servers, clients, Internet service providers, and communication media. A system according to embodiments may have a static or dynamic topology. Network(s) 1010 may include a secure network such as an enterprise network, an unsecure network such as a wireless open network, or the Internet. Network(s) 1010 may also coordinate communication over other networks such as PSTN or cellular networks. Network(s) 1010 provides communication between the nodes described herein. By way of example, and not limitation, network(s) 1010 may include wireless media such as acoustic, RF, infrared and other wireless media.

Many other configurations of computing devices, applications, data sources, and data distribution systems may be employed to implement an interactive TTS optimization and prompt generation tool. Furthermore, the networked environments discussed in FIG. 10 are for illustration purposes only. Embodiments are not limited to the example applications, modules, or processes.

Figure 11:
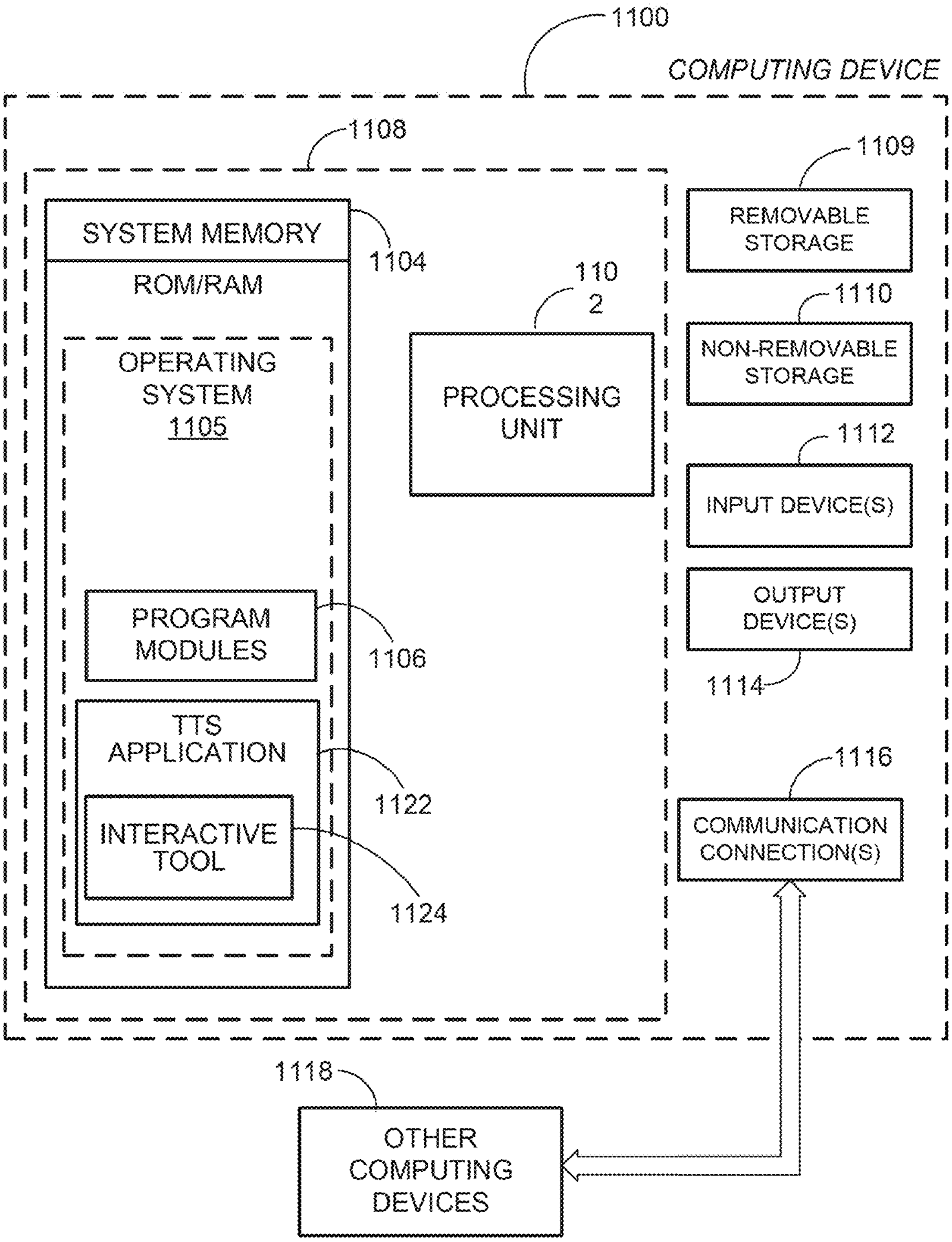
FIG. 11 is a block diagram of an example computing operating environment, where embodiments may be implemented.

FIG. 11 and the associated discussion are intended to provide a brief, general description of a suitable computing environment in which embodiments may be implemented. With reference to FIG. 11, a block diagram of an example computing operating environment for an application according to embodiments is illustrated, such as computing device 1100. In a basic configuration, computing device 1100 may be a server executing a communication application with TTS features and include at least one processing unit 1102 and system memory 1104. Computing device 1100 may also include a plurality of processing units that cooperate in executing programs. Depending on the exact configuration and type of computing device, the system memory 1104 may be volatile (such as RAM), non-volatile (such as ROM, flash memory, etc.) or some combination of the two. System memory 1104 typically includes an operating system 1105 suitable for controlling the operation of the platform, such as the WINDOWS® operating systems from MICROSOFT CORPORATION of Redmond, Wash. The system memory 1104 may also include one or more software applications such as program modules 1106, TTS application 1122, and interactive tool 1124.

TTS application 1122 may be any application that synthesizes speech as discussed previously. Interactive tool 1124 may be an integral part of TTS application 1122 or a separate application. Interactive tool 1124 may enable users to provide text for conversion to speech, visually and audibly provide feedback on alternatives for different pronunciation of the text, and enable the user to modify the parameters. This basic configuration is illustrated in FIG. 11 by those components within dashed line 1108.

Computing device 1100 may have additional features or functionality. For example, the computing device 1100 may also include additional data storage devices (removable and/or non-removable) such as, for example, magnetic disks, optical disks, or tape. Such additional storage is illustrated in FIG. 11 by removable storage 1109 and non-removable storage 1110. Computer readable storage media may include volatile and nonvolatile, removable and non-removable media implemented in any method or technology for storage of information, such as computer readable instructions, data structures, program modules, or other data. System memory 11011, removable storage 1109 and non-removable storage 1110 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1100. Any such computer readable storage media may be part of computing device 1100. Computing device 1100 may also have input device(s) 1112 such as keyboard, mouse, pen, voice input device, touch input device, and comparable input devices. Output device(s) 1114 such as a display, speakers, printer, and other types of output devices may also be included. These devices are well known in the art and need not be discussed at length here.

Computing device 1100 may also contain communication connections 1116 that allow the device to communicate with other devices 1118, such as over a wireless network in a distributed computing environment, a satellite link, a cellular link, and comparable mechanisms. Other devices 1118 may include computer device(s) that execute communication applications, other directory or presence servers, and comparable devices. Communication connection(s) 1116 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 12:
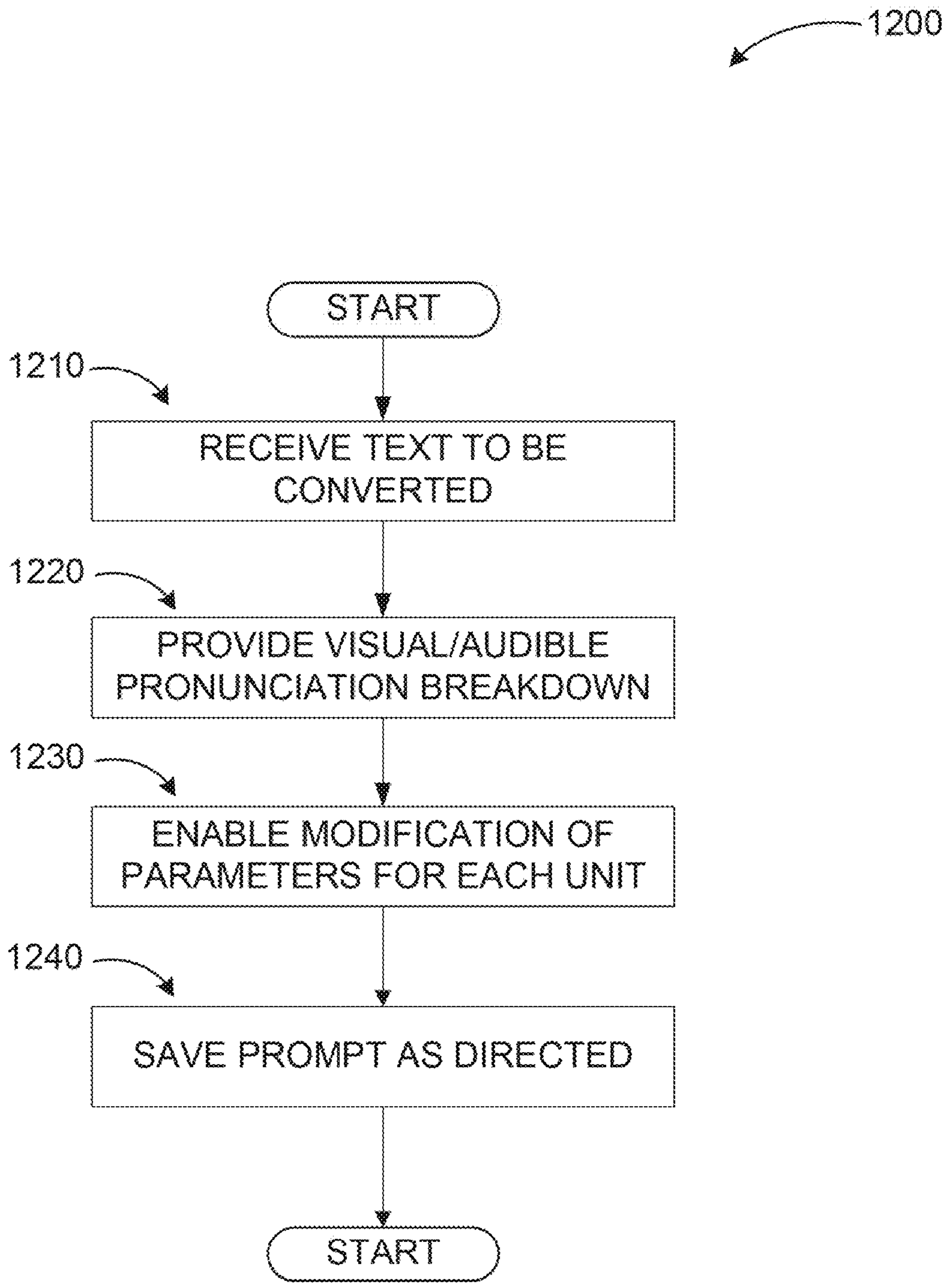
FIG. 12 illustrates a logic flow diagram for implementing an interactive TTS optimization tool according to embodiments.

FIG. 12 illustrates a logic flow diagram for process 1200 of implementing an interactive TTS optimization and prompt generation tool according to embodiments. Process 1200 may be implemented as part of a speech synthesis application.

Process 1200 begins with optional operation 1210, where text to be converted to speech is received from a user. The interactive tool may enable the user to provide the text by typing, by importing from a document, or any other method. At operation 1220, a first pass at synthesis is made employing default (and/or user preferred) parameters. The synthesized speech is provided in audible form to the user with a playback option, and a phonetic breakdown of the prompt is also presented.

At operation 1230, the user is enabled to modify various parameters of the TTS system based on visual cues provided by the interactive tool as discussed in the example user interfaces previously. As part of the modification process, alternative pronunciations may be provided visually and audibly (playback option).

When the user is finished and indicates that he/she would like to save the end product, the modified prompt is saved at operation 1240 for subsequent use by another application such as an Interactive Voice Response (IVR) system.

The operations included in process 1200 are for illustration purposes. An interactive TTS optimization and prompt generation tool may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for enabling users to generate and optimize Text To Speech (TTS) prompts, the method comprising:

receiving text to be converted to speech at a TTS engine;

performing analysis on the text to be converted at a text analysis component for extracting individual words of the text to be converted;

performing linguistical analysis on the individual words of the text to be converted at a linguistic analysis component for extracting phonemes;

providing an interactive tool configured to:

synthesize an initial prompt based on the phonemes of the text at a wave synthesizer;

present the synthesized prompt along with the received text and a corresponding pronunciation using phonetic characters;

provide a plurality of user interface controls for modifying prosody parameters of the synthesized prompt based on the received text, wherein at least a portion of the user interface controls are visually linked with the presented pronunciation;

upon receiving an indication of completion from a user, enable the user to save the synthesized prompt; and providing the synthesized prompt to an application.

2. The method of claim 1, wherein the TTS engine is a concatenative TTS engine and the method further comprises:

extracting prosody information from the received text employing a Hidden Markov TTS (HTS) system;

synthesizing the initial prompt based on the prosody information extracted by the HTS system.

3. The method of claim 1, further comprising:

enabling the user to speak the received text;

recording the user's spoken audio;

extracting prosody information from the recorded audio; and synthesizing the initial prompt based on the prosody information extracted from the recorded audio.

4. The method of claim 3, wherein the prosody information includes at least one from a set of: a duration, a pitch variation, and an energy associated with each phoneme of the recorded audio.

5. The method of claim 1, wherein the plurality of user interface controls enable the user to perform at least one from a set of:

correct frontend errors;

reselect acoustic units;

adjust a duration of selected acoustic units;

adjust an energy of selected acoustic units; and modify a pitch variation of selected acoustic units.

6. The method of claim 1, wherein the synthesized prompt is saved as at least one from a set of: a structured project file, a recording file, and binary data.

7. The method of claim 1, wherein the interactive tool is further configured to present the received text in actionable format such that the user is enabled to select individual words and view text analysis results.

8. The method of claim 1, wherein the corresponding pronunciation is presented using phonetic characters according to International Phonetic Alphabet (IPA).

9. The method of claim 1, wherein the interactive tool is further configured to present alternative acoustic units with distinct pitch variations for the user to select.

10. The method of claim 9, wherein the user is further enabled to modify a pitch variation of a selected alternative acoustic unit.

11. The method of claim 1, wherein the interactive tool is further configured to enable the user to one of: delete, insert, and replace a phonetic character in the presented pronunciation.

12. A computing device for executing a Text To Speech (TTS) application with an interactive prompt generation and TTS optimization tool, the computing device comprising:

a memory;

a processor coupled to the memory for executing the TTS application, wherein the interactive prompt generation and TTS optimization tool of the TTS application is configured to:

enable a user to provide prompt text to be converted to speech;

perform analysis on the received text at a text analysis component for extracting individual words of the received text;

perform linguistical analysis on the individual words of the received text, including one or more of: text normalization, pre-processing, or tokenization, at a linguistic analysis component for extracting phonemes of the received text;

assign phonetic transcriptions to each word of the received text and divide and mark the individual words of the received text into prosodic units, like phrases, clauses, and sentences at the linguistic analysis component;

extract prosody information from the received text employing a Hidden Markov TTS (HTS) system;

synthesize an initial voice prompt based on the phonemes of the received text and the prosody information extracted by the HTS system at a wave synthesizer component;

present the received text and a pronunciation corresponding to the initial voice prompt using standardized phonetic characters;

provide a plurality of user interface controls for modifying prosody parameters of the initial voice prompt, wherein at least a portion of the user interface controls are visually linked with the presented pronunciation; and upon receiving an indication of completion from a user, enable the user to save the modified voice prompt as at least one from a set of: a structured project file, a recording file, and binary data.

13. The computing device of claim 12, wherein the interactive prompt generation and TTS optimization tool is further configured to:

enable the user to speak the received text;

record the user's spoken audio;

extract prosody information from the recorded audio; and further synthesize the initial voice prompt based on the prosody information extracted from the recorded audio.

14. The computing device of claim 12, wherein the user controls include a selection element for presenting the user alternative pitch variations for selected acoustic units of the presented pronunciation, a slide scale for enabling the user to modify a duration of selected acoustic units, and a slide scale for enabling the user to modify an energy of selected acoustic units.

15. The computing device of claim 14, wherein the user controls further include a playback element for enabling the user to listen to one of: a selected acoustic unit and the entire modified voice prompt.

16. The computing device of claim 12, further comprising:

a data store coupled to the processor for storing user provided prompt text, corresponding voice prompts, alternative acoustic units, and training data for the TTS application.

17. A computer-readable storage medium with instructions stored thereon for providing a Text To Speech (TTS) application with an interactive prompt generation and TTS optimization tool, the instructions comprising:

enabling a user to provide a text prompt to be converted to speech;

performing analysis on the text to be converted at a text analysis component for extracting individual words of the text to be converted;

performing linguistical analysis on the individual words of the text to be converted, including one or more of: text normalization, pre-processing, or tokenization, at a linguistic analysis component for extracting phonemes associated with the text to be converted;

synthesizing an initial voice prompt based on the phonemes and prosody information extracted at a wave synthesizer component from at least one of:

the received text employing a Hidden Markov TTS (HTS) system; and a recording of user spoken form of the text prompt, wherein the prosody information includes a pitch variation, a duration, and an energy for each acoustic unit of the prompt;

presenting the received text prompt, a pronunciation corresponding to the initial voice prompt using standardized phonetic characters, and a sequence of acoustic units of the pronunciation in actionable format such that the user is enabled to view alternative acoustic units, text analysis results, and pitch variations;

providing a plurality of user interface controls for modifying prosody parameters of the initial voice prompt, wherein at least a portion of the user interface controls are visually linked with the presented acoustic unit sequence;

enabling the user to listen to one of individual acoustic units and the entire modified pronunciation;

upon receiving an indication of completion from a user, enabling the user to save the modified voice prompt as at least one from a set of: a structured project file, a recording file, and binary data and performing a feedback process to check the quality of the saved voice prompt at the wave synthesizer component.

18. The computer-readable medium of claim 17, wherein the user controls include an element for suggesting to the user acoustic units to be replaced in the acoustic unit sequence.

19. The computer-readable medium of claim 17, wherein the user controls further include elements for sorting pitch variation alternatives and duration alternatives.

20. The computer-readable medium of claim 17, wherein the synthesized voice prompt is processed and saved as a "Session" and the instructions further comprise:

providing a user interface for managing stored sessions, creating new sessions, and deleting existing sessions.

* * * * *